July 31, 1934. J. G. KAESTNER 1,968,780
MILK COOLER
Filed July 2, 1931   3 Sheets-Sheet 1
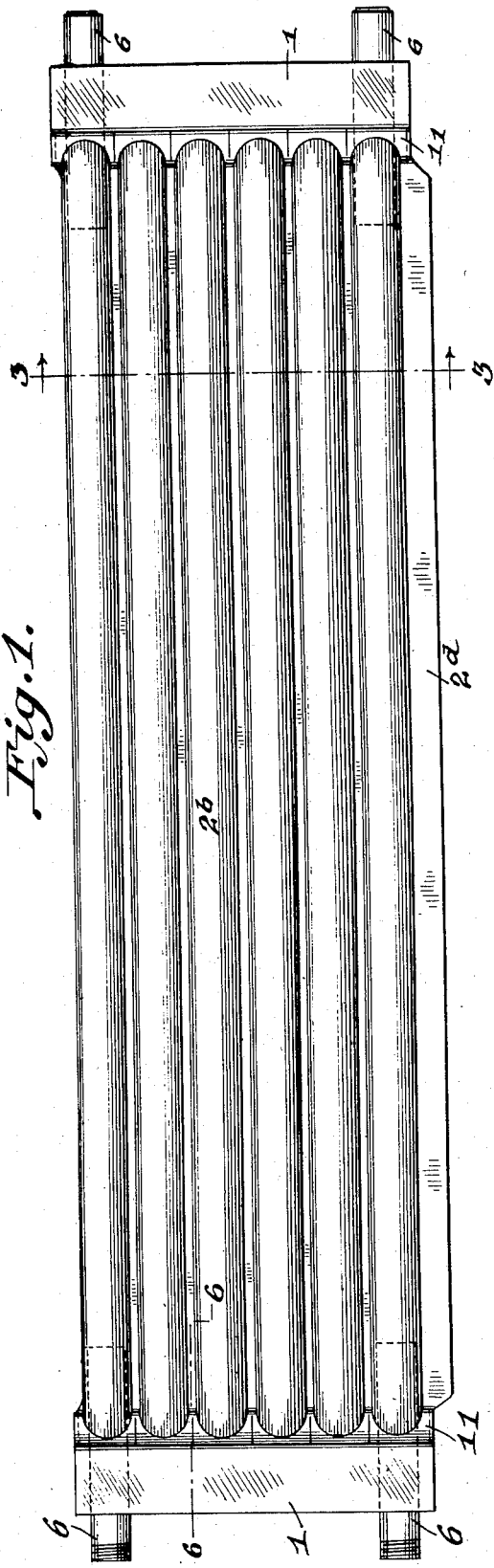
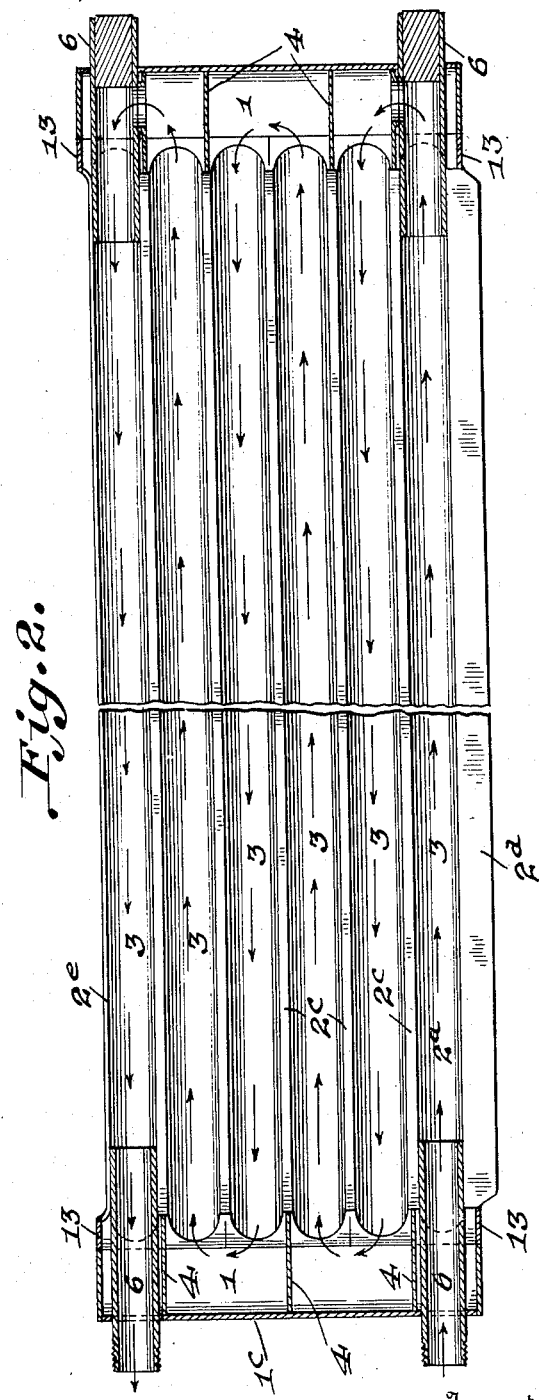
Inventor
J. G. Kaestner
By
Hubert E. Peck   Attorney

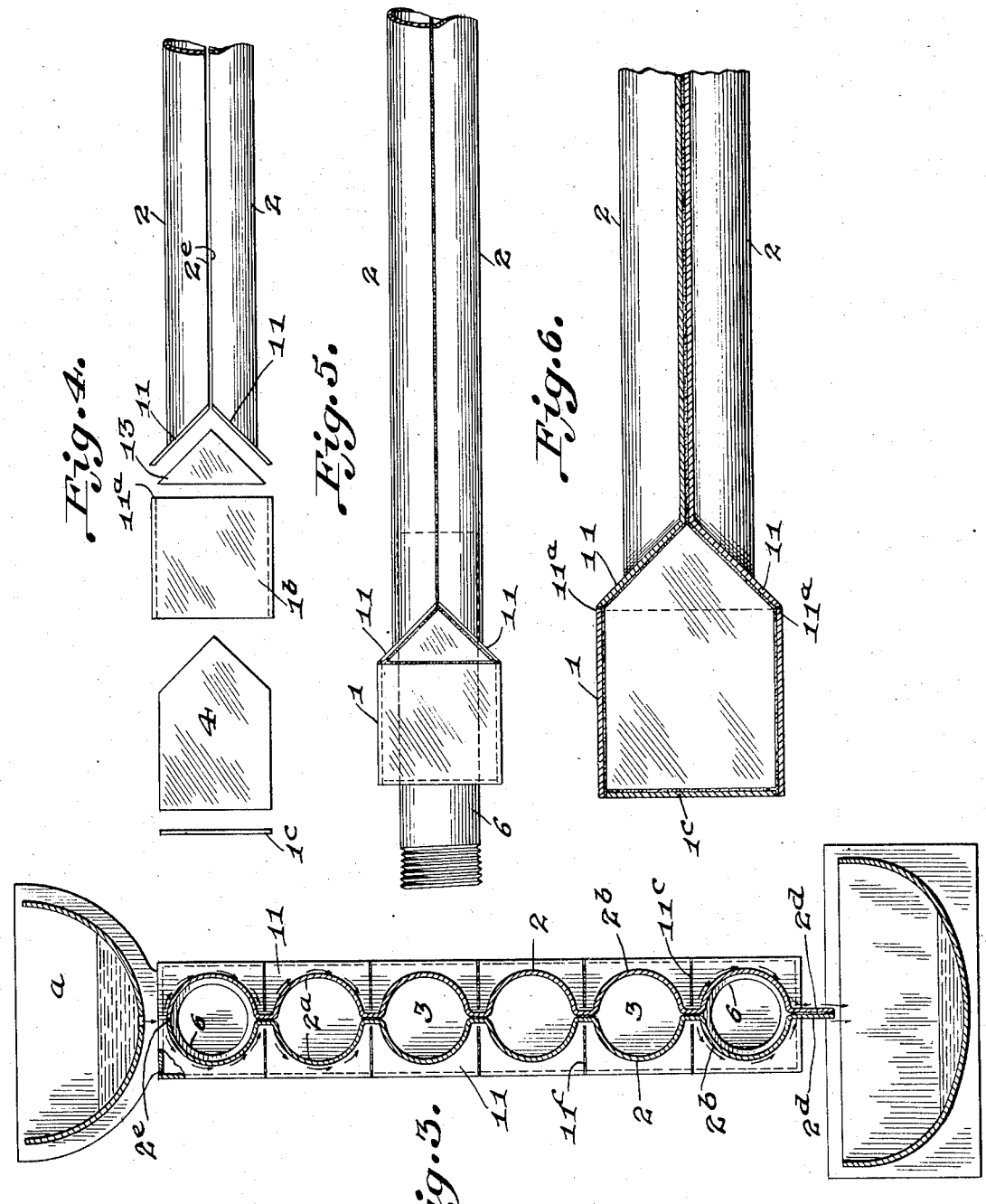

July 31, 1934.  J. G. KAESTNER  1,968,780
MILK COOLER
Filed July 2, 1931  3 Sheets-Sheet 3

Inventor
J. G. Kaestner
By
Hubert E. Peck  Attorney

Patented July 31, 1934

1,968,780

UNITED STATES PATENT OFFICE 1,968,780

MILK COOLER

John George Kaestner, Baltimore, Md., assignor to The E. A. Kaestner Company, Baltimore, Md., a corporation of Maryland Application July 2, 1931, Serial No. 548,424

3 Claims. (Cl. 257—179)

This invention involves improvements in milk coolers or other heat exchange organizations that are subject to substantially like conditions when in use; and the objects and nature of the invention will be understood by those skilled in the art in light of the following explanations of the accompanying drawings that illustrate what I now believe to be the preferred mechanical expression or embodiment of the invention from among other forms, constructions and arrangements within the spirit and scope of the invention.

An object of the invention is to so improve milk coolers and the like heat exchange organizations as to eliminate or reduce to the minimum electrolytic action tending to break down joints or that otherwise tend to shorten the effective life of such coolers and other heat exchange organizations, and to eliminate the deteriorating action of milk and acids therein on the metals included in the cooler structure and on the metallic surfaces of such coolers which the milk contacts.

And a further object of the invention is to so improve the construction of milk coolers and the like, that stainless steel can be economically employed to the exclusion of other metals or materials in such combination with the stainless steel units or parts as might result in electrolytic action due to the presence of acids and other substances present in milk.

And a further object of the invention is to provide certain improvements in structure, organization and assembly to produce a highly desirable and efficient milk cooler and in the method of producing the same.

With the foregoing and other objects in view, the invention consists in certain novel features of structure, material, combination, and in a certain production and assembly method, as hereinafter more fully explained and specified.

Referring to the accompanying drawings, forming a part hereof:—

Fig. 1 shows an embodiment of the cooling unit of my invention, in side elevation.

Fig. 2 is a vertical longitudinal section of said unit.

Fig. 3 is a cross section on line 3—3, Fig. 1.

Fig. 4 shows various elements of the structure separated and in top plan, the corrugated plates being partially broken away.

Fig. 5 shows a portion of the unit in top plan, certain welded seams being shown in an exaggerated manner.

Fig. 6 shows a header and portion of the filler in horizontal section, showing exaggerated seams.

Figure 7:
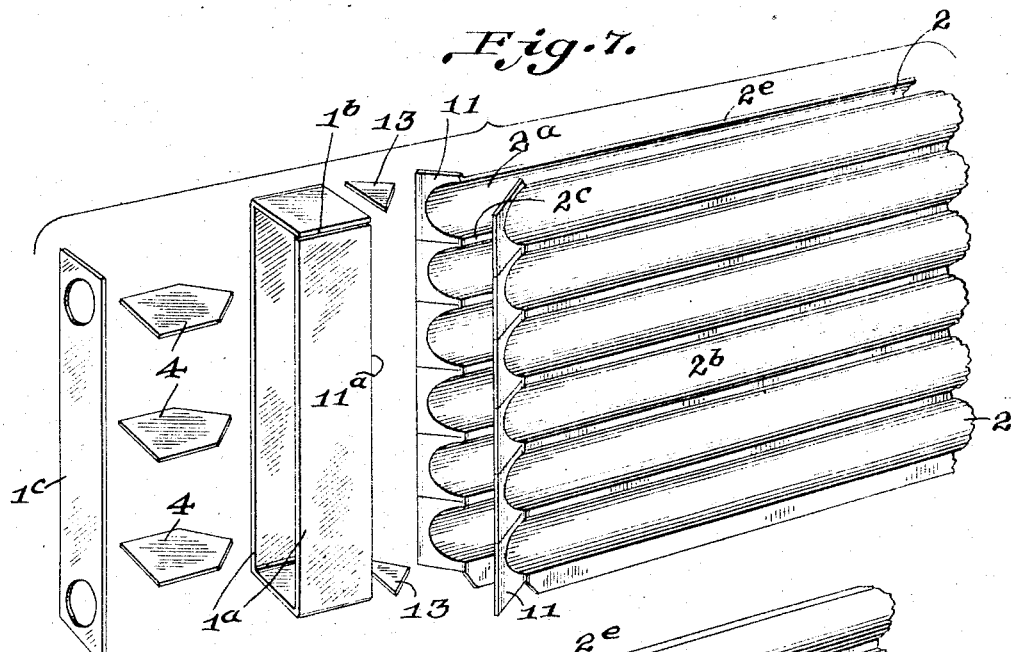
Fig. 7 is a perspective of various elements of the structure, separated, with the corrugated plates partially broken away.
Figure 8:
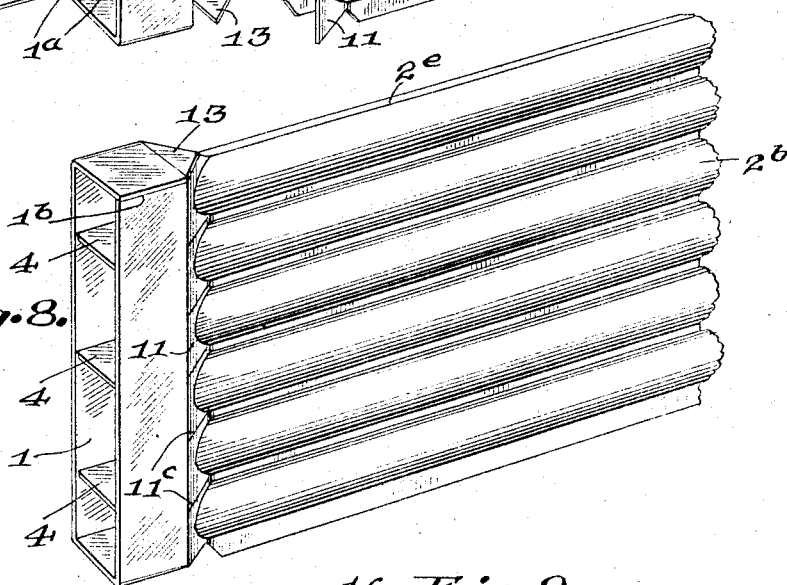
Fig. 8 is a detail perspective of part of the filler and one end header welded thereto, the outer closing wall of the header not being shown.
Figure 9:
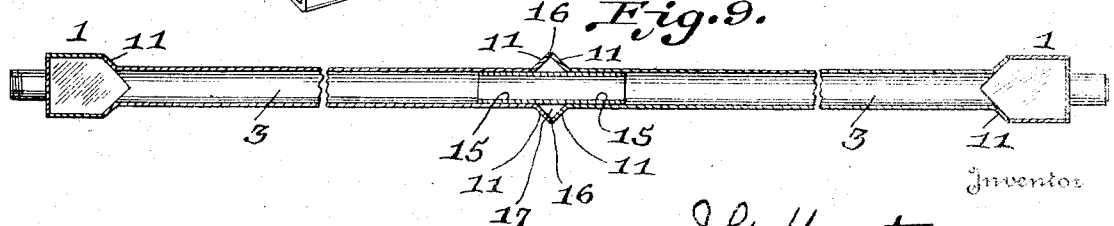
Fig. 9 shows a modification in horizontal section.

The milk coolers now in common use, with which I am familiar, include several metals or other materials in their make up with the result that destructive acid action and/or electrolytic action is set up by the presence of acids or other substances in the milk, with leaking coolers and sometimes tainted milk as the results, while other coolers that have attempted to overcome the just noted difficulties, are almost prohibitive in cost. These coolers, now on the market with which I am familiar, are usually composed of backings of one metal with surface coatings of another metal, and/or metal parts united by solder or welds that introduce different metals into the structure, with the result that the useful life of these coolers is more or less short, by reason of breaking down of joints and/or seams, with resulting leakage. Substances in the milk attack the joints, seams, and contacts between the different metals and electrolytic action destructive to the metals is set up.

I find that certain non-corrodible metals that are inert to the action of milk are highly desirable for the construction of milk coolers particularly where employed without the presence of a foreign or different metal adjacent to the non-corrodible metal or where such other metal will come in contact with the milk or in such other relation as to result in destructive electrolytic action. In this connection, one of the non-corrodible metals to which I refer and that has satisfactorily measured up to the requirements of my invention, is a stainless chromium usually nickel steel alloy known as "KA-2 stainless steel", and is produced by several steel manufacturers under different trade names; this product as made by one steel manufacturer being known as "Allegheny Metal". This product, which I hereinafter term "stainless steel", is expensive even in sheet or plate form, while in the form of tubes it is very expensive. I find that this stainless steel can be finished to a smooth highly polished brilliant glass like surface that is inert to and is not tarnished by milk or by the steam and hot water or other solutions employed for cleansing and sterilizing milk coolers, or by the atmosphere of and air in dairies and milking treating plants, but apparently remains indefinitely in its polished condition, and does not retain film or other deposits from the milk flowing in contact therewith and is easily cleansed and sterilized by materials and methods followed in dairies and milk plants. I also find that I can gain economy in milk cooler construction by using the raw unfinished surfaces of the stainless steel plates or sheets to form the cooling water-contacting interior surfaces of the cooler, while finishing and highly polishing only those surfaces of said sheets or plates that will constitute the exterior milk contacting surfaces of the cooler. I also find that these stainless steel plates or sheets are of high tensile strength and are exceedingly hard, and yet are peculiarly suited and adapted for union by direct welding where no foreign or different metal likely to bring about electrolytic action in the presence of milk, is introduced into the permanent finished product, and are peculiarly adapted for electric arc as well as electric seam welding. I have also found that by building the milk coolers solely of this stainless steel, particularly from stainless steel plates or sheets united by welded joints having no foreign or different metal included therein, so that the entire hollow cooling unit has no other metal than the stainless steel included therein, I avoid the danger of damage by electrolytic action, and produce a cooling unit that should be to all intents and purposes indestructible insofar as the action of the acids and other ingredients in milk, sterilizing steam and hot cleansing liquids and solutions and electrolytic action. The structure and assembly and the production method of my invention, also enable me to economically employ this expensive stainless steel in milk cooler construction.

In the particular example illustrated, I show a milk cooler wherein the milk discharges by gravity from a top trough or milk holder a, as by a central longitudinal bottom row of milk outlets, onto the top of a cooling unit so constructed and arranged that the milk from the supply trough flows down the exterior cooling surfaces of both vertical sides of the unit and drops from the bottom of the unit into and is collected by a bottom trough, as will be understood by those skilled in the art.

In the example illustrated, the cooling unit embodies two vertical hollow end headers 1, and a vertically arranged hollow filler section connecting and extending between the two headers and, in effect, integral therewith, and providing the exterior opposite side horizontal parallel convexed corrugations and intervening "spat" portions, down which the milk flows in the form of thin films for cooling, and that also by registration of the concaved sides of said corrugations form a vertical series of parallel horizontal cooling liquid cross passages 3, within said filler that open into the interiors of the headers, for the flow of the cooling or refrigerating liquid or fluid within the headers and filler.

In the example shown, the two headers 1, are preferably identical in dimensions and construction, although I do not wish to so limit all features of my invention, and each consists of an elongated hollow box having top and bottom, usually flat, ends, front and rear usually flat wide vertical side walls, a usually flat vertical outer edge wall, and an open vertical inner edge that in the completed unit is closed by the flanged vertical ends of the filler section as hereinafter described.

In this example, the headers are built up from flat plates or sheets of said stainless steel, say of about No. 12 gauge, with the surfaces thereof that will form the interior surfaces of the headers in their raw or unfinished state or condition, and with the opposite surfaces thereof that form the exterior surfaces of the headers finished smooth and polished as hereinbefore explained. For instance, a long flat strip 1a, of said steel can be suitably bent to form the two ends of a header and the front and rear side walls thereof and the ends of the strip are permanently welded together to form a liquid tight seam 1b, without the permanent introduction of any foreign metal into the welded seam. If so desired, this seam can be formed by electric welding. The elongated rectangular box or annulus thus formed is open at its opposite longitudinal sides or edges and at one side provides longitudinal edges of the stainless steel plate to which the longitudinal edges of the flanges at one end of the filler section can be welded and cross edges to which gusset plates can be welded, as hereinafter described. This open-side box, at its opposite side provides edges to which an elongated rectangular plate 1c, of said stainless steel can be welded to form the vertical outer edge wall of the header, as hereinafter described.

The hollow corrugated filler section that joins the two headers of the unit, is in the example shown, composed of two preferably identical corrugated and flanged stiff plates 2, of said stainless steel, each struck up from a flat plate or sheet of said steel or, say, No. 16 gauge.

Each plate 2, is struck up and shaped by any suitable means or method, to form a series of similar uniformly spaced straight approximately semi-cylindrical corrugations throughout the approximate width of the plate with the corrugations extending throughout the length of the plate and at the ends of their concave sides 2a, opening through the plate ends. The concave sides 2a, of the corrugations are all on one side of the plate, constituting what I term the inner or concave side of the plate, while all of the convex sides 2b, of the corrugations are on the other, or what I term the exterior or convex side of the plate. The corrugations are separated, at the convex side of the plate by longitudinal similar valleys having longitudinal floors of substantial width to receive and provide ample room for the rolling electrodes or contacts of an electric seam welding machine. At the concave side of the plate, these valley floors form longitudinal parallel spaced flat contact or welding faces 2c, of substantial width and in length equal to the lengths of the corrugations. The faces 2c, are in a common plane and the inner face of the depending lip 2d, and of the top inner edge 2e, of the top corrugation of the plate are also preferably in said common plane. The opposite ends of each corrugated plate 2, are by any suitable method or means, bent outwardly to form the two preferably similar inclined outwardly flaring or diverging end flanges 11, arranged transversely of the plate length and each in length approximately equal to the width of the plate. The width of each flange exceeds the radius of each semi-cylindrical corrugation and these flanges close the valleys between the corrugations at the outer or convex side of the plate and project outwardly beyond the plane of the crowns of the corrugations and form straight longitudinal outer edges for welding to corresponding longitudinal edges 11a, of the headers, as hereinafter explained.

The inner side of the steel plate that will form the inner surfaces of the concave side of plate 2, and its end flanges is left in the raw unfinished state, while the outer side of the steel plate that forms the outer side of the flanges and the convexed side of plate 2, is finished and polished as hereinbefore described.

The surplus metal at the ends of the valleys, resulting from the operation of bending the ends of the plate outwardly to form the flanges can sometimes be taken care of and more or less compressed into the flanges by a striking up or die operation, although, as at present advised by experience, I prefer to form appropriate properly located cuts in the ends of the flat plate or sheet blank of said steel, before the corrugating and flanging operation or operations, so that when the flanging is completed, the edges of each cut will squarely meet and abut in the completed flat inclined flanges and can be made liquid tight by welding, such as electric welding without the permanent addition of a different metal, thereby forming closed joints 11c.

The hollow filler section that joins two headers is formed by assembling two preferably identical corrugated flanged plates 2, with their inner concave sides together and their concavities accurately registering and their welding faces 2c accurately fitting and abutting throughout their lengths and widths, and their top longitudinal edges 2e, accurately abutting, and the inner faces of their bottom lips 2d, accurately abutting. The two stiff rigid plates when thus fitted together at their inner faces are thus held or clamped, during the welding operations by which the plates are united or directly fused together into what is, in effect, an integral or one piece unit. The two plates are united throughout the lengths of each pair of valley floors, and throughout the length of lips 2d, and throughout the lengths of top edges 2e, by seam welds without the addition of other metal, all while the two rigid stiff plates are held together in parallelism. Electric seam welding machinery can be employed if so desired, particularly for welding the valley floors and lips 2d, together, as the rollers or wheel electrodes can travel along the floors at the outer sides of the plates. These welds thus form the closing seams between the cylindrical cooling fluid passages 3, within the unit while the seam between the lips 2d, closes the bottom of the bottom passage 3, and the seam between edges 2e, closes the top of the top passage 3.

When the two plates 2, are thus permanently united, without the addition of any other metal to the peculiar steel of the plates making up this filler section, I have a section provided with a pair of outwardly flaring flanges at both ends formed for welding to the end headers to close the inner open sides thereof and form the inner vertical edge walls of said headers.

When the hollow filler section has been completed as just described, each end thereof is permanently equipped with a header body. I have hereinbefore described how each header body open at opposite sides, is formed from a strip of flat stainless steel. Each open rectangular annulus-like header body is fitted centrally on a set of said flanges with the longitudinal edges of the flanges fitting the longitudinal edge walls of the body and said abutting edges of the header body and flanges are permanently united by welding, without adding a different metal, to form liquid tight welded seams 11a.

The triangular openings at the opposite ends of each set of flaring flanges 11, at the top and bottom of the cooler unit, after the header bodies have been permanently united to the open header bodies, are permanently closed by triangular gussets 13, placed over said top and bottom openings and welded completely around their edges to the end edges of the flanges and the top and bottom edges of the filler section and to the inner transverse edges of the top and bottom end walls of the header bodies. These gussets are cut from flat plate or sheet stainless steel, say of 12 gauge, and the liquid tight seal uniting the same into the cooling unit is made by welding without adding other metal into the unit.

When the header bodies have thus been permanently united to the filler section, said headers are open at their outer edges or sides, with their inner sides or walls formed by the sets of flaring flanges 11, with all of the cylindrical passages 3, opening into the interiors of the headers.

Cross partitions 4, are preferably arranged in the headers to require the cooling fluid, to follow a zigzag path in flowing through the cooler, i. e., to flow in one direction through certain passages 3, from one header to the other and in the opposite direction through the remaining passages from the other header to the first mentioned header. These partitions are preferably cut from flat plate stainless steel having unfinished surfaces and are inserted in the headers through the open outer sides of the headers to the desired locations out of alinement with the passages and are then secured by welding without the use of other metal. The partitions are welded at their edges to the interior surfaces of the front and rear walls of the headers.

After the partitions 4, have thus been inserted and welded in place, the open outer sides of the headers are permanently closed liquid tight by stainless steel flat cover plates 1c, permanently united to the outer edges of the header bodies by welding without the use of added different metal.

These plates 1c, that form the vertical outer edge walls of the headers, have holes formed therethrough in alinement with the top and bottom passages 3, within the cooling unit. Straight lengths of strong stainless steel tube or pipe 6, extend through said holes and are permanently united to said plates by welding without the use of added different metal to form liquid tight seams between the exteriors of the pipes and plates. The pipe lengths project laterally at the exterior of the cooling unit to form supporting lugs or trunnions by which the cooling unit is upheld in any suitable supporting frame such as commonly used in the milk cooler art.

These supporting trunnions are braced and rendered rigid, in addition to performing certain other functions, by extending the pipe lengths that form the trunnions, transversely across the interiors of the headers and substantial distances into the passages 3, with which they are alined with a running or snug fit.

The two pipe lengths at one end of the cooling unit are closed at their outer ends against liquid passage and have side openings within the header to permit circulation of the cooling fluid between the passages 3, in which said two pipe lengths are located and the interior of the header. The two pipe lengths at the other end of the cooler are threaded at their outer ends to form the cooling fluid inlet and outlet nipples whereby the cooler is coupled into the cooling fluid supply and circulating system, and hence the walls of these two pipe lengths are unbroken or without radial inlets or outlets within the header traversed thereby but are open only at their inner and outer ends.

In the event that a cooling unit of abnormal or extraordinary length is required, say of greater length than the dimensions of stainless steel plates usually available or of the corrugating apparatus available, I have provided a means and method whereby two units can be coupled together to provide the over all completed cooler unit length required. To accomplish this result, I produce two preferably identical cooler units, as hereinbefore described, each with a completed header at one end, but no header at the opposite end. The headerless end of each cooler unit will have the flaring sets of flanges 11. I then arrange these two cooler sections in alinement, with their headerless ends meeting, first having inserted rigid lengths 15, of stainless steel pipe in all of the passages 3, of one of the cooler sections with the ends of said pipe lengths projecting from said passages and beyond the flaring flanges of said section, so that when the two sections are moved together in alinement flanged end to flanged end, said projecting pipe ends will longitudinally enter the corresponding passages 3, of the second section, and hence will bridge the joint between the sections when they are brought fully together with the vertical longitudinal edges of the two sets of flaring flanges squarely abutting. While the two sections are thus held firmly together in alinement, the longitudinal meeting vertical edges of their sets of flaring flanges are permanently united by welding, without the introduction of added different metal, to form liquid tight welded seams 16, and the top and bottom open ends of the space between the two sets of meeting flanges are closed liquid tight by flat stainless steel plates 17, welded without the addition of different metal to the top edges of the flanges and the top surfaces of the filler sections.

The pipe lengths 15, extend across the space within the meeting flaring flanges and substantial distances into the passages 3, of the two cooler sections and aid in supporting the two sections one from the other, against any tendency to sag, and furthermore said pipe lengths maintain the desired cooling liquid circulation from the passages 3, of one section to the corresponding passages 3, of the other section.

While, as a specific example from among others, I have described a certain stainless non-corrodible metal, yet I do not wish to so limit myself nor do I wish to so limit all features of my invention to any particular make of stainless steel or other non-corrodible metal suitable for my purposes, nor to the particular welding methods given as specific examples, as it is my purpose to provide permanent welded seams and welds uniting the various parts that are proof against and inert with respect to destructive electrolytic action or other destructive action resulting from the presence of milk to which such coolers are subject in use, and if in welding I find it to be desirable to employ foreign substances, I will only employ such welding materials as will not in the finished cooler, depart from the just mentioned requirement. For instance, I have in meeting these requirements, employed electric arc welding methods in the formation of the headers, in uniting the filler flanges thereto, in forming the seams 11c, and uniting the pipe lengths with the header walls, with the use of welding rods, the metal in which is composed of the stainless or non-corrodible metal of which the cooler is composed, but do not wish to so limit my invention.

I do not wish to limit all features of my invention to milk coolers and heat exchange units constructed of stainless or non-corrodible metal, nor to the particular stainless steel alloy hereinbefore identified as other stainless and non-corrodible metals possessing the required strength and capable of being finished and highly polished to a permanent lustre inert to milk, steam and hot cleansing liquids, might be employed, although I have attained the new results in milk coolers, hereinbefore pointed out, by the use of the stainless steel alloy described hereinbefore.

Furthermore, I do not wish to limit all features of my invention to the particular filler section described, nor to the particular end header construction and formation illustrated, as it is obvious that other methods and formations can be followed in producing and constructing such headers, and particularly in the production of headers from flat plate or sheet metal.

What I claim is:—

1. A milk treating unit embodying at least two fillers, each embodying two transversely corrugated vertical plates secured together to form a vertical series of horizontal internal passages for a milk-treating fluid and to provide exterior vertical surfaces down which the milk to be treated exteriorly flows, each filler at one end having a vertical hollow header providing an interior chamber for flow of said fluid and into which the adjacent ends of said passages open, said fillers being arranged in longitudinal alinement with their headers at the outer ends thereof, and with the meeting edges of their respective corrugated plates welded together; and pipe lengths fitted longitudinally in the pairs of alined internal fluid passages of the two fillers and bridging the meeting inner ends of the two fillers.

2. Apparatus for treating milk including a unit having a filler embodying a pair of substantially similar transversely corrugated metal vertical plates welded together at the meeting portions of their inner faces to provide a vertical series of internal horizontal treating fluid passages, said plates at their exteriors providing undulating surfaces down which the milk exteriorly flows, said corrugated plates providing each end of said unit throughout the vertical length of the unit with a pair of vertical outwardly diverging flanges; and box-like vertical end headers for said filler, said headers at their inner vertical sides receiving said flanged ends of the filler and being united thereto by liquid tight joints completely around the filler ends, said headers forming vertical internal treating-fluid chambers outwardly beyond said filler ends and into which the ends of said fluid passages open.

3. Liquid treating apparatus including a unit embodying vertical end headers of hollow box formation providing internal treating liquid chambers and surrounding and outer end walls, and a connecting filler providing a vertical series of horizontal treating liquid passages connecting the chambers of said headers and exterior surfaces for the down flow of liquid to be treated, said filler at each end provided with laterally-projecting, out-turned vertical flanges to confine the liquid to be treated to said exterior surfaces, said flanges fitted within said end headers and welded thereto and forming the closing inner vertical side walls of said headers, said filler embodying a pair of vertical plates united by a vertical series of horizontal welds, at least one of said plates having a vertical series of horizontal undulations, the plate ends being extended to form said laterally projecting end flanges.

JOHN GEORGE KAESTNER.